United States Patent
Okanishi (10) Patent No.: US 10,664,214 B2
(45) Date of Patent: May 26, 2020

(54) IMAGE FORMING APPARATUS

(71) Applicant: CANON KABUSHIKI KAISHA, Tokyo (JP)

(72) Inventor: Tadashi Okanishi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/294,802

(22) Filed: Mar. 6, 2019

(65) Prior Publication Data
US 2019/0286400 A1    Sep. 19, 2019

(30) Foreign Application Priority Data

Mar. 16, 2018    (JP) .................................. 2018-049981

(51) Int. Cl.
*G06F 3/12*    (2006.01)
(52) U.S. Cl.
CPC .......... *G06F 3/1275* (2013.01); *G06F 3/1257* (2013.01); *G06F 3/1273* (2013.01)
(58) Field of Classification Search
CPC ..... G06F 3/1275; G06F 3/1273; G06F 3/1257
USPC ....................................................... 358/1.15
See application file for complete search history.

(56) References Cited

U.S. PATENT DOCUMENTS

2014/0223315 A1*    8/2014    Hagiwara ............... H04L 41/22
                                                            715/736

FOREIGN PATENT DOCUMENTS

| JP | 4784122 B2 | 10/2011 |
|---|---|---|
| JP | 2013046967 A | 3/2013 |
| JP | 2014219912 A | 11/2014 |
| JP | 201595776 A | 5/2015 |
| JP | 2017147668 A | 8/2017 |

* cited by examiner

*Primary Examiner* — Tammy Paige Goddard
*Assistant Examiner* — Darryl V Dottin
(74) *Attorney, Agent, or Firm* — Canon U.S.A., Inc. IP Division (57) ABSTRACT

An image forming apparatus to form an image on a recording material includes a first collecting unit, a second collecting unit, and a changing unit. The first collecting unit collects information regarding the image forming apparatus. The second collecting unit collects information regarding a user using the image forming apparatus. The changing unit changes an image forming operation forming an image on a recording material based on the information regarding the image forming apparatus collected by the first collecting unit and the information regarding the user collected by the second collecting unit.

8 Claims, 11 Drawing Sheets

ENTER USER INFORMATION

DOCUMENT TO BE HANDLED:
- MOSTLY OFFICE DOCUMENT
- SOMETIMES GRAPHICS
- VARIOUS

REMOVE PRINTED MATTER QUICKLY?
- YES
- NO

LOW NOISE ENVIRONMENT?
- YES
- NO

IMPORTANCE OF IMAGE QUALITY
- VERY HIGH
- HIGH
- NOT SO HIGH

WHICH IS IMPORTANT?
- IMAGE QUALITY
- SPEED

WHICH IS IMPORTANT?
- IMAGE QUALITY
- LOW NOISE

WHICH IS IMPORTANT?
- SPEED
- POWER CONSUMPTION

ENTER USER INFORMATION

REMOVE PRINTED MATTER QUICKLY?
 - YES
 - NO

IMPORTANCE OF IMAGE QUALITY
 - VERY HIGH
 - HIGH
 - NOT SO HIGH

WHICH IS IMPORTANT?
 - IMAGE QUALITY
 - SPEED

WHICH IS IMPORTANT?
 - SPEED
 - POWER CONSUMPTION

WHICH IS IMPORTANT?
 - SPEED
 - POWER CONSUMPTION

FIG. 15

FIG. 16

IMAGE FORMING APPARATUS

BACKGROUND

Field of the Disclosure

The present disclosure relates to an image forming apparatus such as a copier and a printer.

Description of the Related Art

Conventionally, a technique has been proposed which, in an image forming apparatus such as a copier and a printer, analyzes an operation history of the image forming apparatus so that a print operation to be performed by the image forming apparatus can be optimized. For example, in an image forming apparatus disclosed in Japanese Patent No. 4784122, a time period taken for discharging a sheet to a sheet discharge tray is measured and, if the time period becomes long, it is determined that a conveyance roller arranged on a conveyance path is abrasive. In Japanese Patent No. 4784122, further discloses a control for increasing a rotation speed of a motor configured to drive the conveyance roller.

Another technique has also been proposed which grasps a user preference to optimize a print operation. For example, according to Japanese Patent Laid-Open No. 2015-95776, a technique has been proposed which grasps an image preferred by a user in advance and adjusts an image to be printed to a tint preferred by a user.

However, attempting optimization of a print operation based on how the image forming apparatus is to be used, the print operation changed only based on information on an operation history may not be one that a user really desires. For example, in a case where an image forming apparatus is used in a high humid environment which may easily cause curling of paper, the print speed of the image forming apparatus may be reduced to reduce the amount of curling. However, this print operation change may not be expected by a user who prefers high productivity.

Conversely, even when the print operation is changed only in a manner desired by a user with priority, the resulting print operation may not be optimized in a real sense. For example, even when the cleaning frequency is reduced for high productivity desired by a user, the image forming apparatus may be used in an environment that is disadvantageous for cleaning. In this case, unacceptable faulty cleaning may occur, which may possibly lower user satisfaction.

SUMMARY

The present disclosure can optimize a print operation to be performed in an image forming apparatus.

According to an aspect of the present disclosure, an image forming apparatus to form an image on a recording material includes a first collecting unit configured to collect information regarding the image forming apparatus, a second collecting unit configured to collect information regarding a user using the image forming apparatus, and a changing unit configured to change an image forming operation forming an image on a recording material based on the information regarding the image forming apparatus collected by the first collecting unit and the information regarding the user collected by the second collecting unit.

Further features of the present disclosure will become apparent from the following description of embodiments with reference to the attached drawings.

DESCRIPTION OF THE EMBODIMENTS

Embodiment 1

Embodiment 1 proposes a method including, first, extracting a printer operation changing purpose from a user preference analysis result, and then determining a specific printer operation changing measure from a printer operation history analysis result.

Description of Configuration of Image Forming Apparatus

Figure 1:
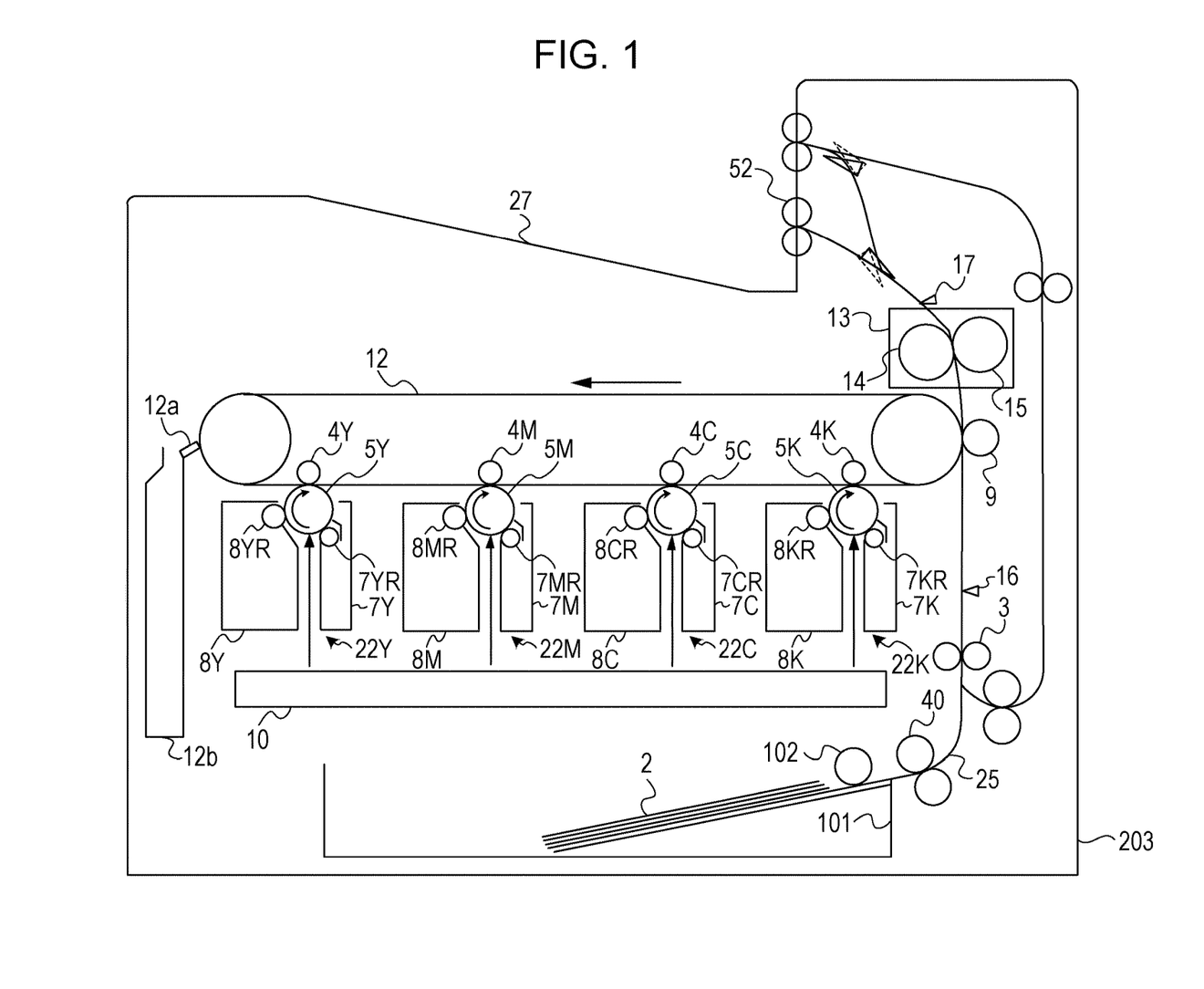
FIG. 1 is a configuration diagram illustrating an image forming apparatus according to Embodiments 1 and 2.

FIG. 1 illustrates an overall configuration of an image forming apparatus according to Embodiment 1. According to this embodiment, an electrophotographic laser beam printer 203 (hereinafter, called a "printer 203") is provided as an image forming apparatus. An image forming section includes a photoconductive drum (5Y, 5M, 5C, 5K), a charging unit (7Y, 7M, 7C, 7K), a development unit (8Y, 8M, 8C, 8K), and a primary transfer roller (4Y, 4M, 4C, 4K) provided for each station arranged in parallel for development colors. The photoconductive drum (5Y, 5M, 5C, 5K), the charging unit (7Y, 7M, 7C, 7K), and the development unit (8Y, 8M, 8C, 8K) are mounted in a cartridge (22Y, 22M, 22C, 22K) detachable from an apparatus main body (also called a housing) of the printer 203.

The photoconductive drum (5Y, 5M, 5C, 5K) is formed by applying an organic photoconductive layer to an outer periphery of an aluminum cylinder and is configured to rotate with driving power transmitted thereto from a drive motor, not illustrated, in counterclockwise direction for an image forming operation. The charging unit (7Y, 7M, 7C, 7K) is provided in each of the stations. Each of the charging units (7Y, 7M, 7C, 7K) has a charge roller (7YR, 7MR, 7CR, 7KR), and the charge rollers (7YR, 7MR, 7CR, 7KR) uniformly charge surfaces of the respective photoconductive drums (5Y, 5M, 5C, 5K). Light is applied selectively from a scanner unit 10 to the surfaces of the photoconductive drums (5Y, 5M, 5C, 5K) so that electrostatic latent images are formed on the photoconductive drums (5Y, 5M, 5C, 5K). In order to visualize each of the electrostatic latent images, the development units (8Y, 8M, 8C, 8K) that develop yellow (Y), magenta (M), cyan (C), and black (K), respectively, are provided in the stations. Each of the development units (8Y, 8M, 8C, 8K) has a development roller (8YR, 8MR, 8CR, 8KR). The development rollers (8YR, 8MR, 8CR, 8KR) are configured to visualize the electrostatic latent images formed on the respective photoconductive drums (5Y, 5M, 5C, 5K) by using toners.

In an image forming period, an intermediate transfer belt 12 rotates in the counterclockwise direction in FIG. 1 in contact with the photoconductive drums (5Y, 5M, 5C, 5K). A primary transfer bias applied to the primary transfer rollers (4Y, 4M, 4C, 4K) causes the visualized images formed on the photoconductive drums (5Y, 5M, 5C, 5K) to be primarily transferred to the intermediate transfer belt 12. Through a nip (secondary transfer position) formed by a secondary transfer roller 9 and the intermediate transfer belt 12, the visualized color images formed on the intermediate transfer belt 12 are secondarily transferred to a sheet 2. The primary transfer rollers (4Y, 4M, 4C, 4K) and the secondary transfer roller 9 rotate by following a rotation of the intermediate transfer belt 12.

A part of the visualized images remains on the intermediate transfer belt 12 without being transferred to the sheet 2 at the secondary transfer position. Because the visualized images left on the belt are no longer necessary, they are removed by a cleaning operation. The cleaning operation includes conveying the unnecessary visualized images by the intermediate transfer belt 12 to a cleaning blade 12a, scraping off the toner of the images by the cleaning blade 12a, and collecting the toner into a waste toner container 12b so that the visualized images are removed.

A cassette tray 101 is a mounting unit on which a plurality of sheets 2 (recording materials) are mounted. While a sheet feeding motor, not illustrated, is rotating, a sheet feeding solenoid, not illustrated, is sucked so that a feed roller 102 rotates. The feed roller 102 feeds a sheet 2 from the cassette tray 101 to a conveyance path 25. The sheet 2 fed by the feed roller 102 is conveyed to a registration roller 3. The conveyance path 25 has a registration sensor 16 thereon, and, when the registration sensor 16 detects a leading edge of the sheet 2, the registration roller 3 conveys the sheet 2 to the secondary transfer position.

A fixing unit 13 conveys the sheet 2 and, at the same time, fixes the visualized color images transferred to the sheet 2. The fixing unit 13 has a fixing roller 14 configured to heat the sheet 2 and a pressing roller 15 configured to bring the sheet 2 in pressure contact with the fixing roller 14. Each of the fixing roller 14 and the pressing roller 15 has a hollow shape, and the fixing roller 14 internally contains a heater. In other words, the sheet 2 holding the visualized color images is conveyed by the fixing roller 14 and the pressing roller 15, and, at the same time, heat and pressure are applied to the sheet 2 thereby so that the toners are fixed onto the surface of the sheet 2. The sheet 2 on which the visualized images have been fixed is discharged to a sheet discharge tray 27 by a discharge roller 52, and the image forming operation ends. A fixing/discharge sensor 17 is arranged on a downstream side of the fixing unit 13 and is configured to detect the presence of a sheet 2 on the conveyance path 25.

Description of Hardware Configuration

Figure 2:
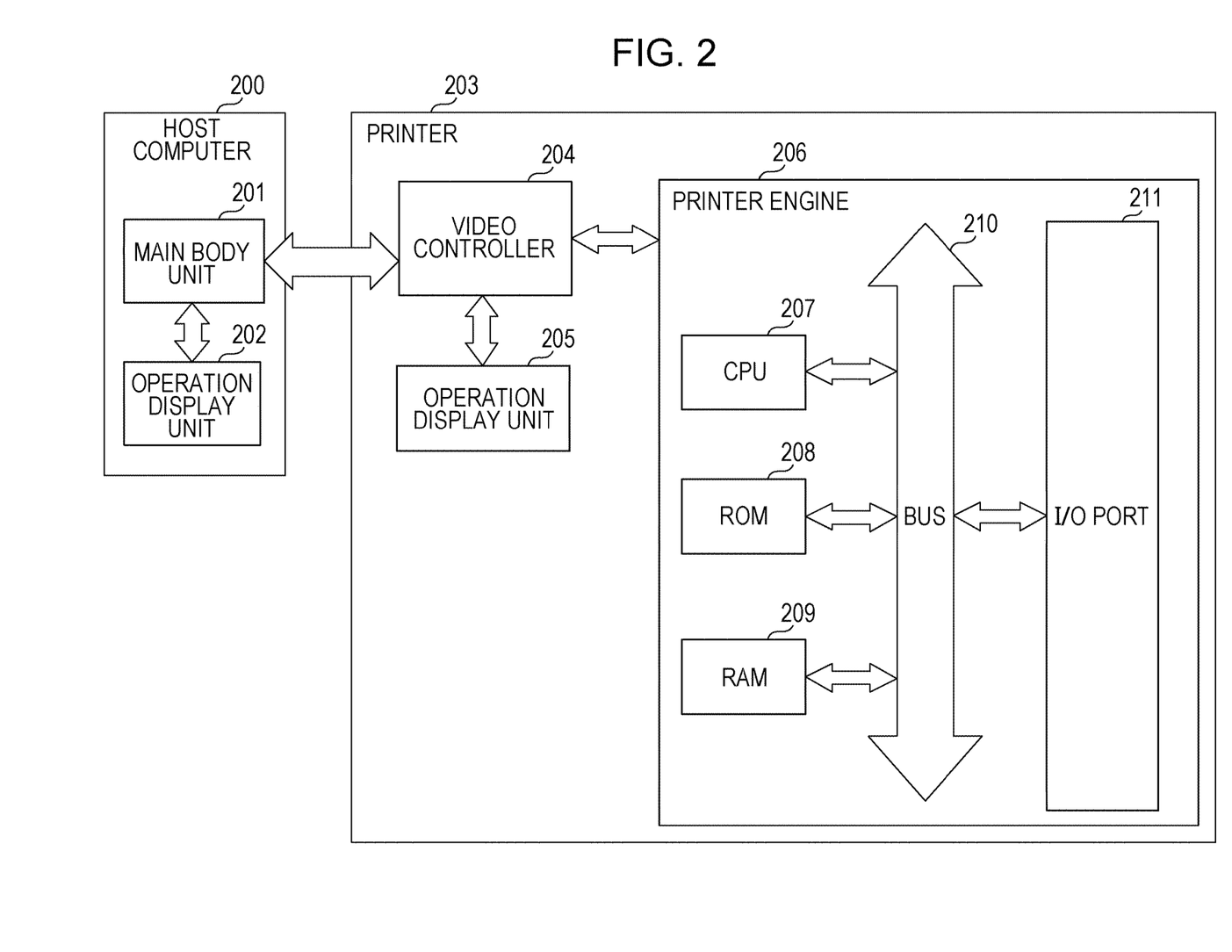
FIG. 2 is a hardware configuration diagram according to Embodiments 1 and 2.

FIG. 2 is a hardware configuration diagram according to Embodiment 1. A hardware configuration according to Embodiment 1 includes a host computer 200 (external apparatus) and the printer 203 as illustrated in FIG. 2. The host computer 200 has a main body unit 201 and an operation display unit 202 configured to instruct the printer 203 to print over a network. The operation display unit 202 in the host computer 200 may include a display, a keyboard, and a mouse, not illustrated.

The printer 203 includes an operation display unit 205, a video controller 204, and a printer engine 206. The operation display unit 205 in the printer 203 includes an operation panel and an operation button, not illustrated. The video controller 204 is configured to transmit print data and a print operation instruction transmitted from the host computer 200 to the printer engine 206. The printer engine 206 includes a CPU 207, a ROM 208, and a RAM 209. The CPU 207 is configured to load a program and data to the ROM 208 and run the program by using the RAM 209 as a work area. These components can access an I/O port 211 via a system bus 210 that is bidirectionally accessible. Actuators, not illustrated, are connected to the I/O port 211, and the CPU 207 controls the actuators to implement sheet conveyance and image forming operations via the I/O port 211.

Description of Functional Blocks

Figure 3:
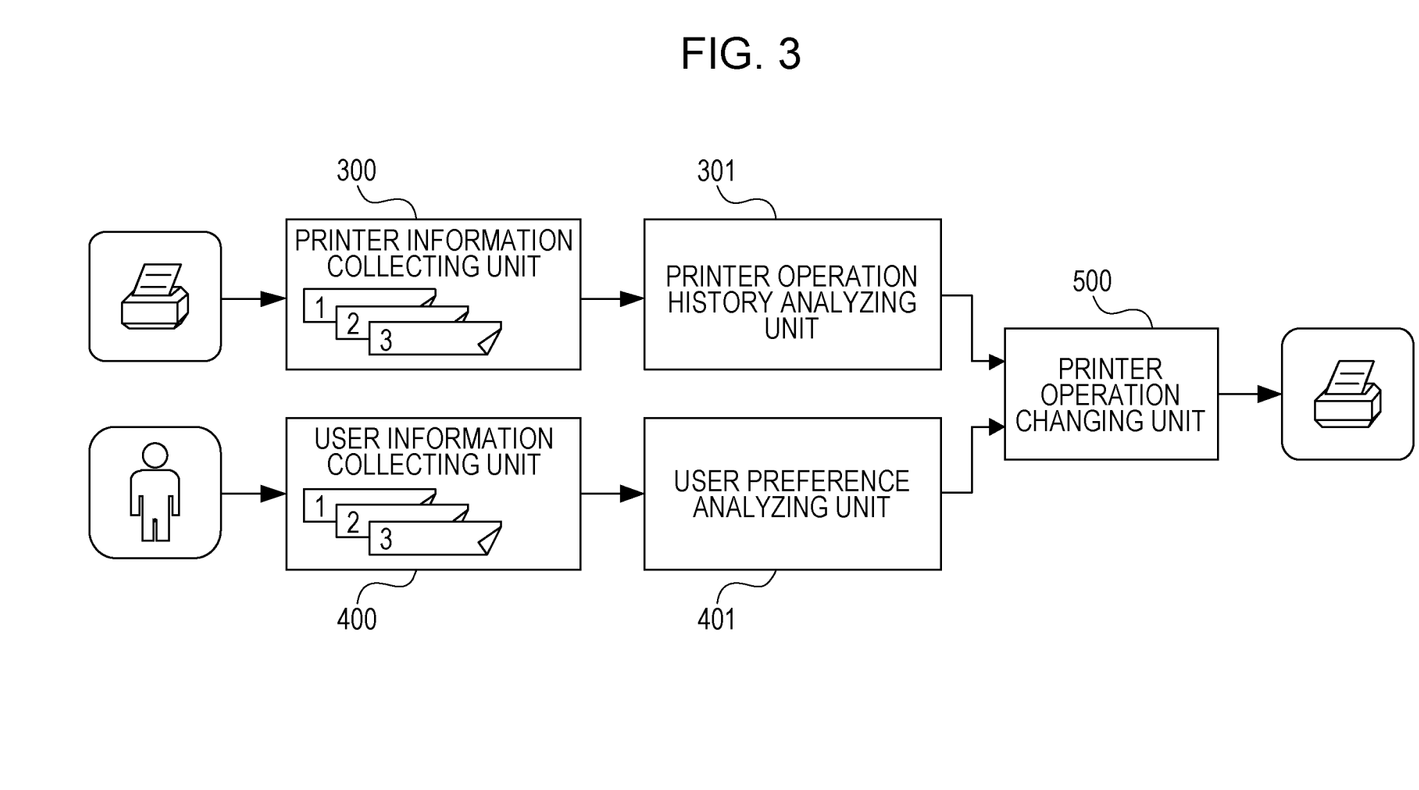
FIG. 3 is a functional block diagram according to Embodiments 1 and 2.

FIG. 3 is a functional block diagram according to Embodiment 1. Information regarding the printer 203 (hereinafter, printer information) is collected by a printer information collecting unit 300. After that, a printer operation history analyzing unit 301 analyzes an operation history of the printer 203. On the other hand, information regarding a user input by a user (hereinafter, user information) is collected by a user information collecting unit 400. After that, a user preference analyzing unit 401 analyzes preferences of the user. Finally, a printer operation changing unit 500 determines an optimum printer operation, and the operation to be performed by the printer 203 for forming an image on the sheet 2 is changed accordingly.

According to this embodiment, the user information collecting unit 400 collects user information by using the operation display unit 202 in the host computer 200 or the operation display unit 205 in the printer 203, and the collected user information is transmitted to the printer engine 206. In the printer engine 206, the CPU 207 runs, as programs, the printer information collecting unit 300, the printer operation history analyzing unit 301, and the user preference analyzing unit 401, and the operation of the printer 203 is finally changed through the I/O port 211.

Description of User Information Collecting Unit 400 and User Preference Analyzing Unit 401

Figure 4:
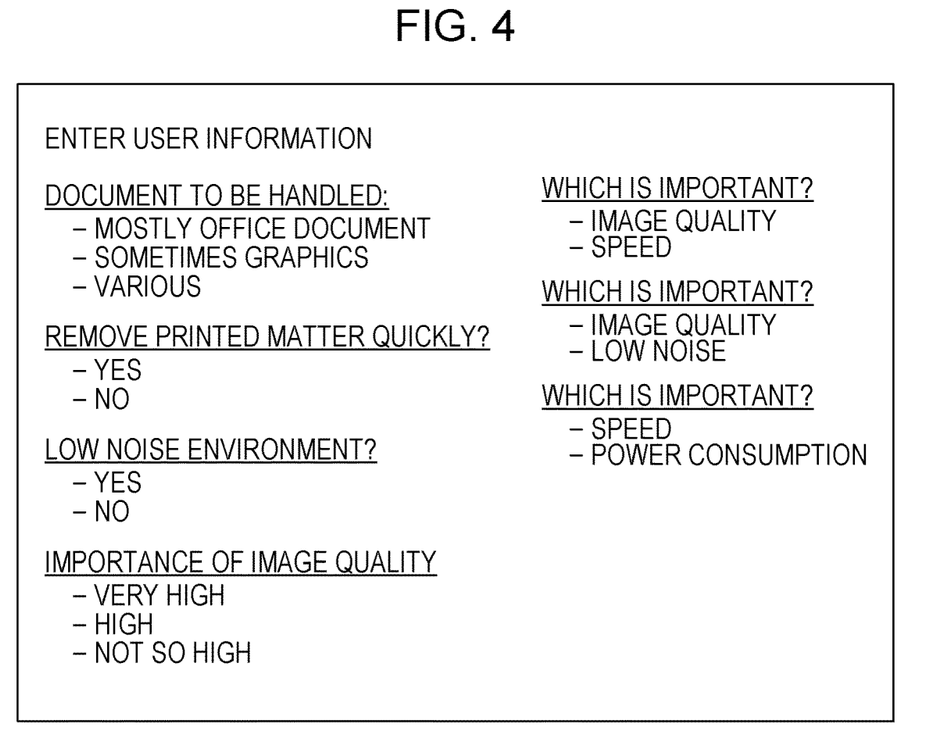
FIG. 4 illustrates an example of a user information input screen according to Embodiment 1.

FIG. 4 illustrates an example of a user information input screen through which user information is to be collected by the user information collecting unit 400 according to Embodiment 1. An input display screen having questions or a questionnaire to a user as illustrated is displayed on the operation panel on the printer 203, for example, and a user may complete the questions or questionnaire through the operation panel so that user information is collected. According to this embodiment, such user information is input before the user actually uses the printer 203. For example, when the printer 203 is installed, a user may input user information through a dialog window, for example, displayed on a screen on the operation display unit 205 in the printer 203 or the operation display unit 202 in the host computer 200. A user who actually inputs the user information may be a user who directly uses the printer 203 or an IT manager who manages printers including the printer 203 installed on the same floor.

Table 1 illustrates examples of a user preference analysis item to be analyzed by the user preference analyzing unit 401 according to Embodiment 1.

TABLE 1

User Preference Analysis Items

| No. | Item | Description |
| --- | --- | --- |
| 1 | Image Quality Preference | Intensity of preference for quality of an image to be printed |
| 2 | Low-Noise Preference | Intensity of preference for low operating noise of a printer |
| 3 | Productivity Preference | Intensity of preference for the speed of printing |
| 4 | Life Preference | Intensity of preference for longer life of a printer |
| 5 | Energy-Saving preference | Intensity of preference for low power consumption of a printer |

Figure 5:
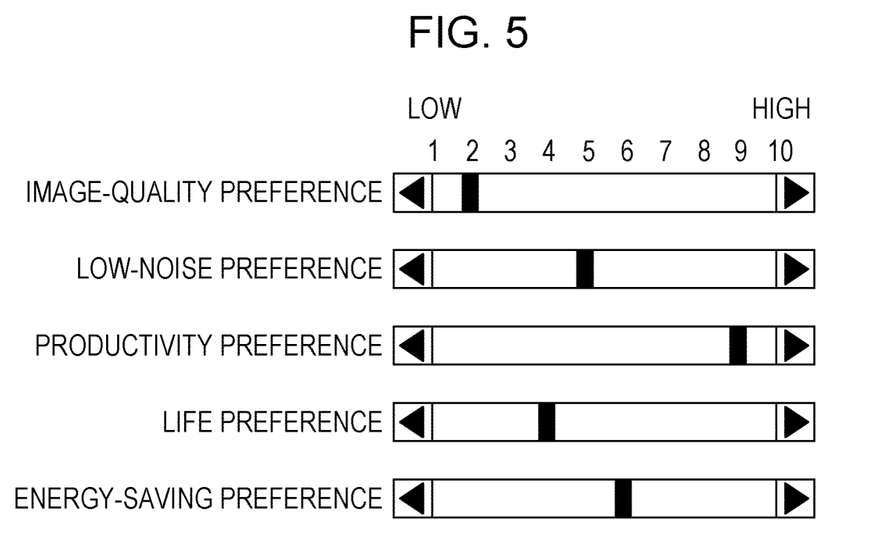
FIG. 5 illustrates an example of a user preference analysis result according to Embodiment 1.

FIG. 5 illustrates an example of a user preference analysis result acquired by the user preference analyzing unit 401 according to Embodiment 1. The user preference analyzing unit 401 analyzes the user information acquired by the user information collecting unit 400 and determines the intensity of each of the preferences illustrated in Table 1. For example, in order to determine the intensity of the preference for image quality, the number of selections of image quality with priority to the questions is counted in the collected user information according to this embodiment. Then, the ratio of the count to the total number of questions as a population parameter is calculated to determine its intensity of the preference. In the same manner, the same calculation is performed for preferences for low noise and productivity to determine one of 10 intensities of the preferences. As a result, referring to the example in FIG. 5, it is determined that the preference intensity for productivity enhancement is high while the preference intensity for image quality is low.

According to this embodiment, without limiting the input display screen to that illustrated in FIG. 4, a user may be allowed to directly input one of 10 intensities of preference for items of image quality, low noise, productivity, lifetime, and energy saving.

Descriptions of Printer Information Collecting Unit 300 and Printer Operation History Analyzing Unit 301

Table 2 illustrates examples of printer information to be collected by the printer information collecting unit 300 according to Embodiment 1.

TABLE 2

Printer Information

| No. | Item | Description |
| --- | --- | --- |
| 1 | Print history | History relating to print information for each sheet |
| 2 | Environmental History | History relating to the temperature and humidity of the environment having the printer |
| 3 | Error History | History relating to jam, alerts, failures and so on |

Table 3 illustrates examples of a printer operation history analysis item to be analyzed by the printer operation history analyzing unit 301 according to Embodiment 1.

TABLE 3

Printer Operation History Analysis Items

| No. | Item | Description |
| --- | --- | --- |
| 1 | Print Settings | Analysis on printing modes, feeding ports, sheet sizes, sheet types and so on |
| 2 | Control Parameters | Analysis on control parameters |
| 3 | Operating Conditions | Environmental analysis per hour and analysis on operating hours and numbers of printed sheets. |
| 4 | Error Occurrence Conditions | Analysis on occurrences of errors such as jams, alerts, and failures |

Description of Printer Operation History Analysis Result

Figure 6:
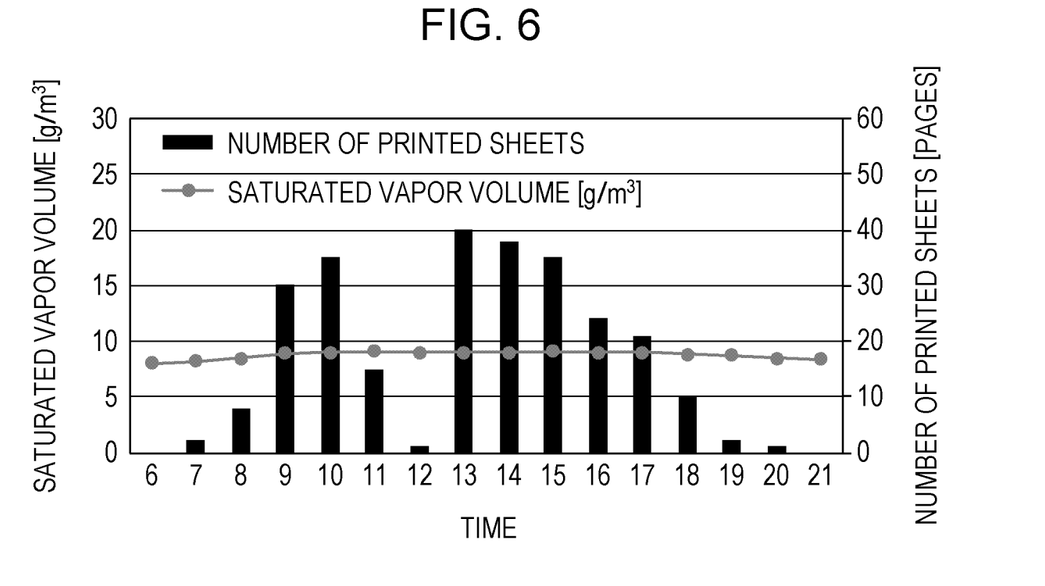
FIG. 6 illustrates a first example of a printer operation history analysis result according to Embodiment 1.
Figure 7:
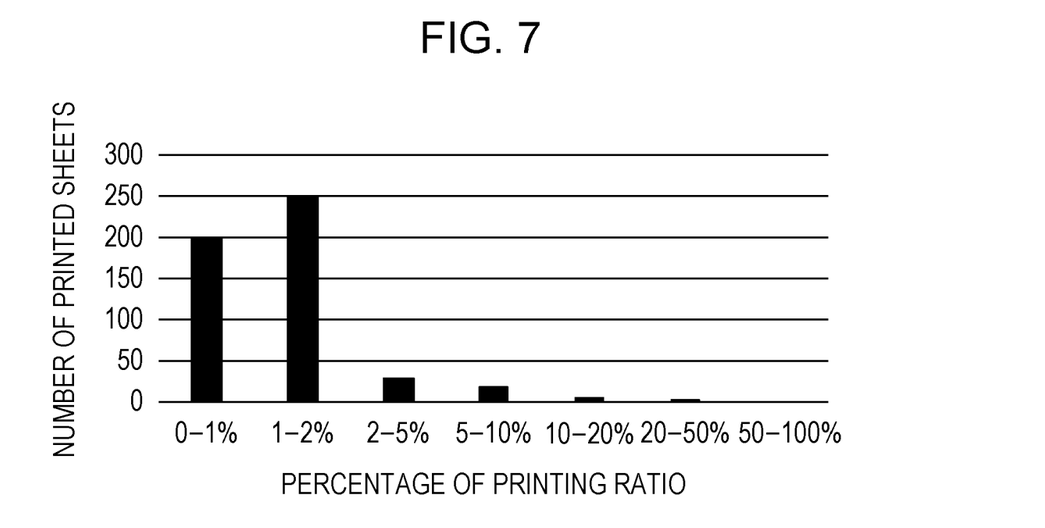
FIG. 7 illustrates a second example of the printer operation history analysis result according to Embodiment 1.
Figure 8:
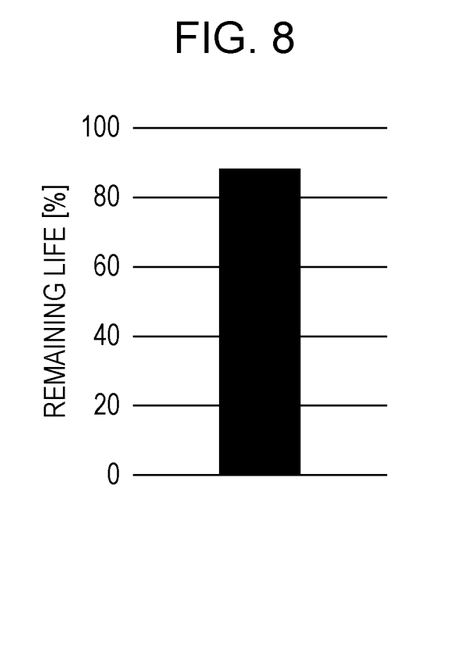
FIG. 8 illustrates a third example of the printer operation history analysis result according to Embodiment 1.

The printer 203 is operated for a certain period of time so that the printer information collecting unit 300 can store printer information and analyze a printer operation history. FIG. 6, FIG. 7, and FIG. 8 illustrate examples of printer operation history analysis results acquired by the printer operation history analyzing unit 301 according to Embodiment 1. First, FIG. 6 illustrates the number of printed sheets and the saturated vapor volume of an environment where the printer 203 is placed per hour. The average of the saturated vapor volumes is approximately 8.7 g/m$^3$, and the variation amount is approximately 1.1 g/m$^3$. Therefore, it is determined that the environment where the printer 203 is placed has less variation and does not have high and low humidities. FIG. 7 illustrates percentages of printing ratio. Here, the term "printing ratio" refers to a ratio of an area to which toner is adhered to an area of the sheet 2. Referring to FIG. 7, most printed materials have printing ratio lower than 2%. Therefore, it is determined that the printed images are not graphics but mainly text. FIG. 8 illustrates a remaining life percentage of the intermediate transfer belt 12. Referring to FIG. 8, because the remaining life percentage is equal to or higher than 80%, it is determined that the intermediate transfer belt 12 is still new.

Description of Printer Operation Changing Unit 500 According to Embodiment 1

Table 4 illustrates examples of a printer operation changing item to be selected by the printer operation changing unit 500 according to Embodiment 1.

TABLE 4

Printer Operation Changing Items

| Purpose | Measure | Description | Printer Operation History Condition |
|---|---|---|---|
| Enhancement of Conveyance Performance | 1 | Execute jam avoidance sequence. | High jam occurrence rate with specific feeding port and sheet type |
| | 2 | Execute curl reduction sequence. | Paper type disadvantageous for curling in high-temperature and high-humidity environment |
| Image Quality Improvement | 1 | Shift to high gloss mode. | Many images with high printing ratio are printed on glossy paper |
| | 2 | Increase calibration frequency. | Some time zones with low operating rate and easily variable environment |
| Productivity Enhancement | 1 | Stop shift to sleep mode. | High operating rate at the time zone |
| | 2 | Reduce image adjustment frequency. | Less variable environment, mainly text data to be printed, and low average printing ratio |
| | 3 | Reduce belt cleaning frequency. | Still new belt in environment where faulty cleaning does not easily occur |

Figure 9:
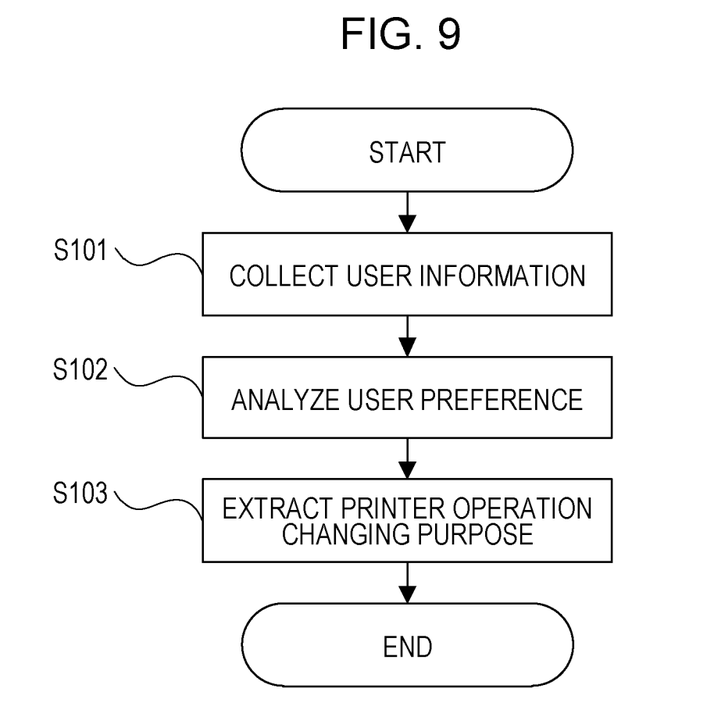
FIG. 9 is a flowchart for determining a printer operation changing purpose according to Embodiment 1.

FIG. 9 is a flowchart for determining a printer operation changing purpose by the user preference analyzing unit 401 according to Embodiment 1. A control based on the flowchart in FIG. 9 is executed by the CPU 207 based on a program stored in the ROM 208, for example.

According to this embodiment, user information is input through the operation display unit 205 in the printer 203 or the operation display unit 202 in the host computer 200 (S101) before the printer 203 is used. After the user information is collected, when the user preference analyzing unit 401 completes an analysis on user preferences (S102), the printer operation changing unit 500 extracts a printer operation changing purpose corresponding with the user preferences from Table 4 (S103).

As described with reference to FIG. 5, it is determined that the user has a high intensity of preference for productivity enhancement based on the user preference analysis result acquired by the user preference analyzing unit 401 according to this embodiment. As a specific method for computing a high intensity of preference according to this embodiment, a method is applied in which an item having the largest difference from the average of all intensities of preferences is selected. According to this embodiment, the intensity of preference for productivity is 9 against 5.2 of the average of all intensities of preference. In this case, the difference is 3.8 that is the largest. Therefore, productivity enhancement is extracted as a printer operation changing purpose. Various other kinds of methods may be applied for calculating a high intensity of preference. For example, instead of an average value of all intensities, a method may be easily reached in which 5 is set as a mean value of intensities of preference, and a high intensity of preference is selected based on the magnitude of the difference from the mean value.

Figure 10:
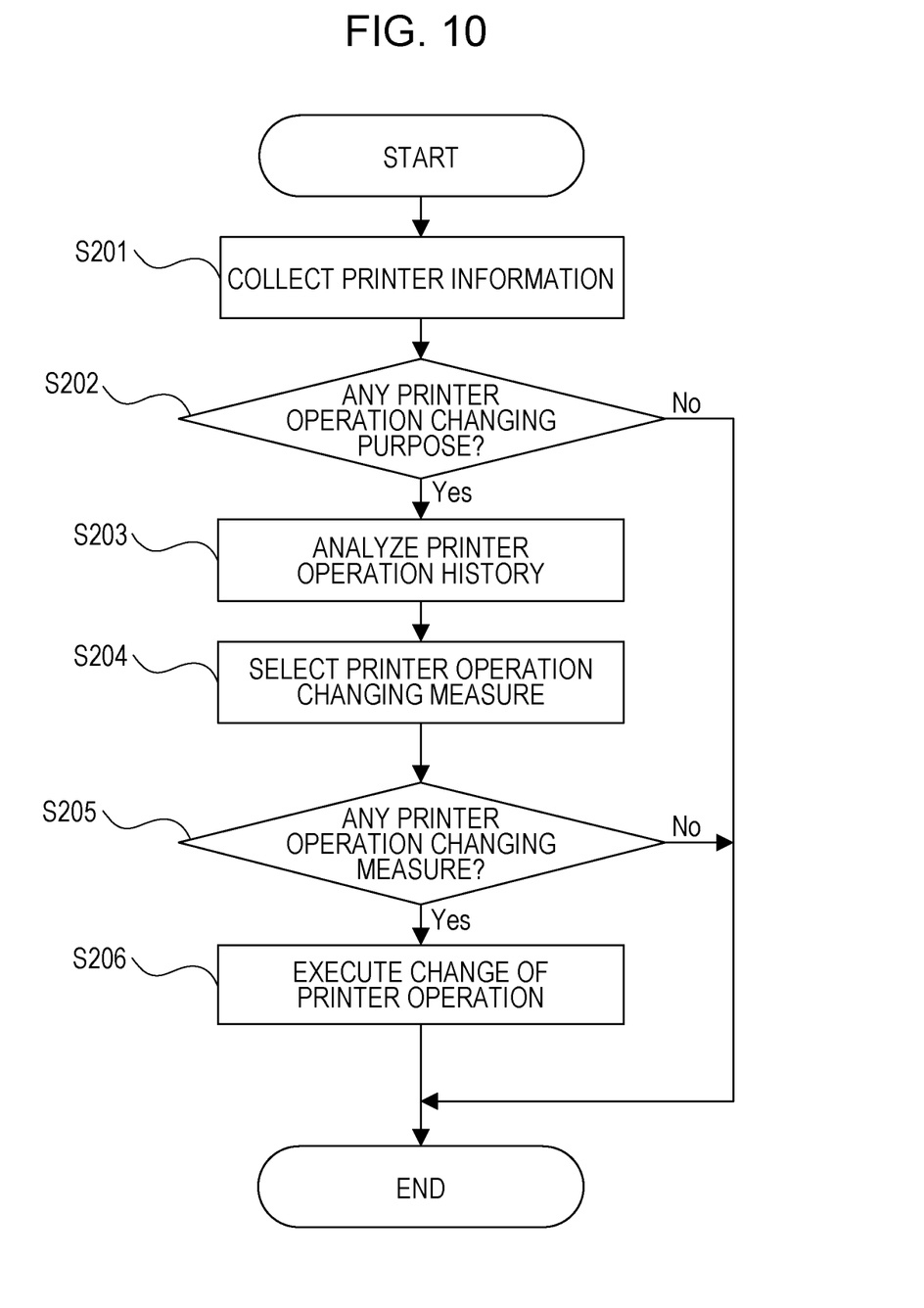
FIG. 10 is a flowchart for determining a printer operation changing measure according to Embodiment 1.

FIG. 10 is a flowchart for determining a printer operation changing measure according to Embodiment 1. A control based on the flowchart in FIG. 10 is executed by the CPU 207 based on a program stored in the ROM 208, for example.

First, the printer 203 is operated so that printer information is collected/stored by the printer information collecting unit 300 (S201). At the timing of storing the printer information, the printer operation changing unit 500 determines the presence or absence of a printer operation changing purpose extracted in FIG. 9 (S202). If any extracted printer operation changing purpose is present, the printer operation history analyzing unit 301 analyzes a printer operation history (S203). The printer operation changing unit 500 then selects a specific measure that achieves the changing purpose illustrated in Table 4 based on the printer operation history analysis result (S204). If there is no selectable measure based on the analysis of the printer operation history (if there is no measure with which user preferences and the printer operation history are compatible), the printer operation changing unit 500 does not select any measure and goes to the next step. The printer operation changing unit 500 determines whether at least one specific measure has been selected for achieving the changing purpose (S205). If any specific measure is selected, the printer operation is changed to implement the measure (S206).

A specific algorithm for processing in S202 to S204 according to this embodiment will be described. First, from the printer operation history analysis result in FIG. 6 and FIG. 7 as described above, an environmental variation is as low as approximately 1.1 g/m$^3$, mainly text data have been printed, and the percentage of an average printing ratio of 2% or lower is approximately 89%. Therefore, Measure 2 is selected for achieving productivity enhancement. It is determined from FIG. 8 that the belt is still new, and it is determined from FIG. 6 that the printer 203 is placed in an environment in which faulty cleaning does not easily occur. Measure 3 is also selectable that achieves productivity enhancement.

The possibility remains not a little that implementation of Measure 2 or Measure 3 causes reduction of image quality and faulty cleaning. However, it has already been recognized that the user does not have a high intensity of preference for image quality from FIG. 5. More specifically, while an average of all intensities of preference is 5.2, the intensity of preference for image quality is 2. The lower side difference is 3.2 at a maximum. Therefore, even when adverse effects of image quality occur not a little, the possibility of lowering user satisfaction can be reduced.

Therefore, Measure 2 or Measure 3 can be determined as a specific printer operation changing measure for the purpose of productivity enhancement. Based on this result, the printer operation change can be executed.

According to Embodiment 1, as described above, a printer operation changing purpose is extracted from a user preference analysis result, and a specific printer operation changing measure can be determined from a printer operation history analysis result. As a result, the operation to be performed by the printer 203 can be optimized.

Embodiment 2

Embodiment 2 proposes a method including, first, extracting a printer operation changing purpose from a printer operation history analysis result and then determining a specific printer operation changing measure from a user preference analysis result. Any repetitive descriptions in Embodiments 1 and 2 will be omitted, and like numbers refer to like parts and like measures.

Description of Printer Operation History Analysis Result

Figure 11:
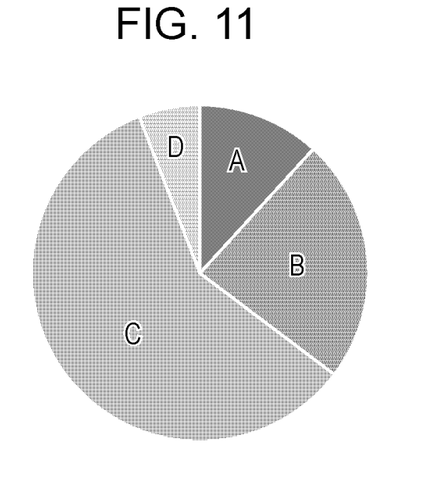
FIG. 11 illustrates a first example of a printer operation history analysis result according to Embodiment 2.
Figure 12:
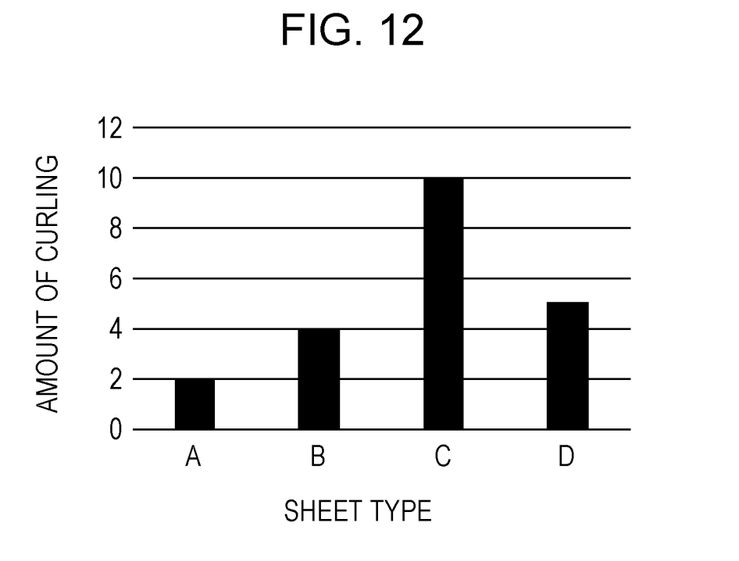
FIG. 12 is a graph illustrating relationships between sheet types and amounts of curling according to Embodiment 2.
Figure 13:
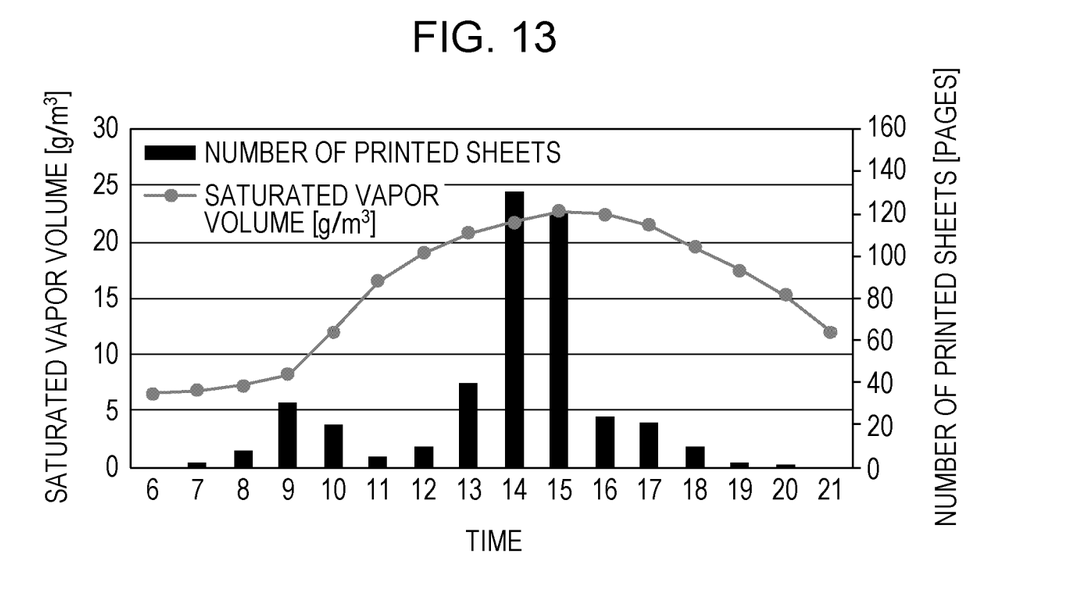
FIG. 13 is a second example of the printer operation history analysis result according to Embodiment 2.

The printer 203 is operated for a certain period of time so that printer information is stored by the printer information collecting unit 300 for an analysis of a printer operation history. FIG. 11 and FIG. 13 illustrate examples of printer operation history analysis results acquired by the printer operation history analyzing unit 301 according to Embodiment 2. First, FIG. 11 illustrates ratio of types of sheets 2 used for print operations. From FIG. 11, it is found that a sheet type C is most frequently used. As a given condition, it has been found in its product study and development phase that the sheet type C possibly has a large amount of curling as illustrated in FIG. 12. As another given condition, it has been found that the sheet 2 of the sheet type C curls in a high humid environment having a saturated vapor volume higher than 20 g/m$^3$. FIG. 13 illustrates the number of printed sheets and the saturated vapor volume of an environment where the printer 203 is placed per hour. Referring to FIG. 13, particularly from 14:00 to 15:00, a higher number of printed sheets are produced in an environment with higher humidity. There is a possibility that a larger amount of curling occurs.

Description of Printer Operation Changing Items

Table 5 illustrates examples of a printer operation changing item according to Embodiment 2.

Descriptions of User Information Collecting Unit 400 and User Preference Analyzing Unit 401 According to Embodiment 2

Figure 14:
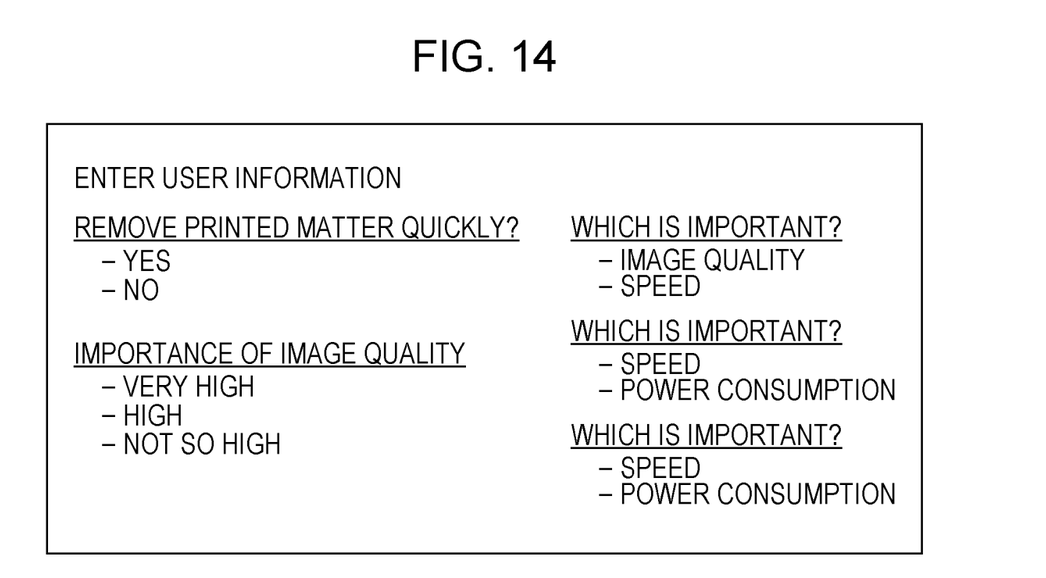
FIG. 14 illustrates an example of a user information input screen according to Embodiment 2.

FIG. 14 illustrates an example of a user information input screen through which user information is collected by the user information collecting unit 400 according to Embodiment 2. Like Embodiment 1, a user may input user information through a dialog window, for example, displayed on the screen on the operation display unit 205 in the printer 203 or the operation display unit 202 in the host computer 200.

According to Embodiment 2, a printer operation changing purpose is first extracted from the printer operation history analysis, and user information regarding items relating to selection of a measure that achieves the changing purpose is then collected. Items for collecting user information are limited so that the load for user input can be reduced and that the load for user preference analysis can also be reduced.

Figure 15:
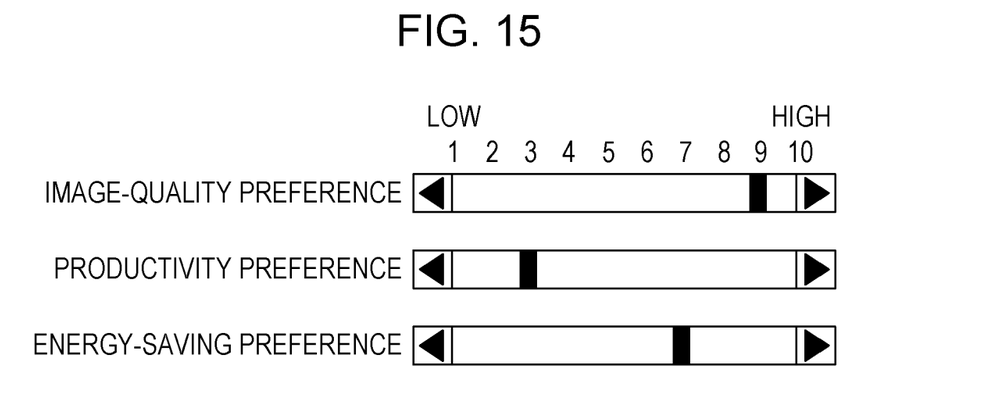
FIG. 15 illustrates an example of a user preference analysis result according to Embodiment 2.

FIG. 15 illustrates an example of the user preference analysis result acquired by the user preference analyzing unit 401 according to Embodiment 2. The specific analysis examples are the same as those of Embodiment 1 and are calculated from the ratio of the number of answers to questions with priority with respect to the collected user information. As a result, according to this embodiment, it is determined that the user has high intensities of preference for image quality and energy-saving while having a low intensity of preference for productivity.

Description of Printer Operation Changing Unit 500

Figure 16:
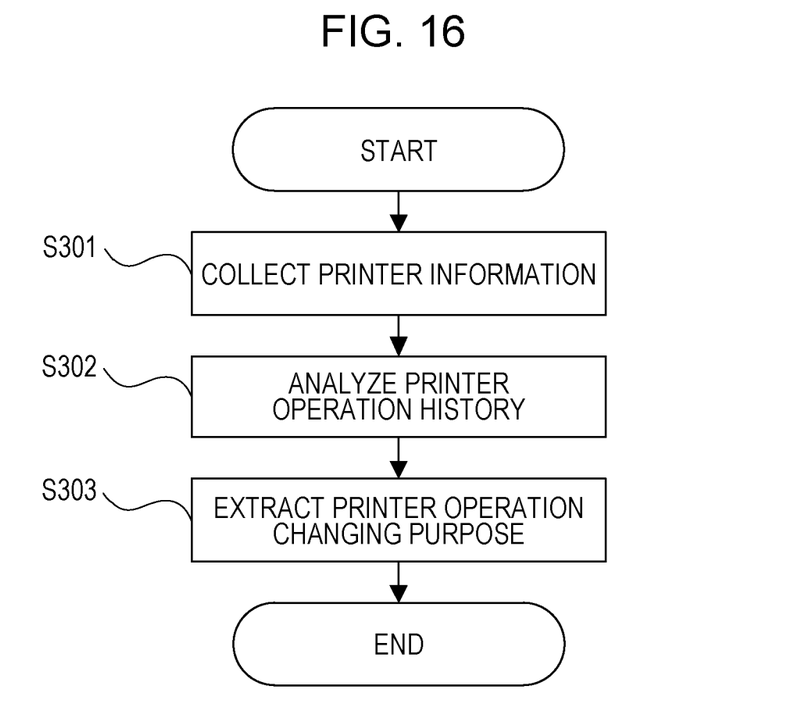
FIG. 16 is a flowchart for determining a printer operation changing purpose according to Embodiment 2.

FIG. 16 is a flowchart for determining a printer operation changing purpose by the printer operation history analyzing unit 301 according to Embodiment 2. A control based on the flowchart in FIG. 16 is executed by the CPU 207 based on a program stored in the ROM 208, for example.

TABLE 5

Printer Operation Changing Items

| | | | Adverse Effects | | | |
|---|---|---|---|---|---|---|
| Purpose | Measure | Description | Low Productivity | Low image quality | High power consumption | Low life percentage |
| Jam Avoidance | 1 | Increase number of paper-feeding retry times | Small | — | — | Small |
| | 2 | Reduce processing speed | Large | — | — | Small |
| Curl Reduction | 1 | Extend Pre-rotation time to sufficiently heat fixing roller | Small | — | Small | Small |
| | 2 | Save toner to reduce fixing temperature therefor | — | Medium | — | — |
| | 3 | Heat fixing unit also in stand-by mode | — | — | Large | Small |
| | 4 | Reduce processing speed | Large | — | — | Small |
| Operating Noise Reduction | 1 | Reduce number of rotations of fan | — | — | Large | — |
| | 2 | Reduce processing speed | Large | — | — | — |

As described above with reference to FIG. 11, FIG. 12, and FIG. 13, it is determined from the printer operation history analysis result according to this embodiment that curl reduction is appropriate as a printer operation changing purpose.

According to this embodiment, a printer operation changing purpose is extracted from the printer operation history analysis. Accordingly, the printer 203 is first operated so that printer information is collected/stored by the printer information collecting unit 300 (S301). When predetermined printer information is stored, the printer operation history analyzing unit 301 analyzes a printer operation history (S302). After that, from Table 5, a printer operation changing purpose is extracted which corresponds with the printer operation history analysis result (S303).

According to this embodiment, as described with reference to FIG. 11, FIG. 12, and FIG. 13, curl reduction is extracted as a printer operation changing purpose based on the printer operation history analysis result according to this embodiment.

Figure 17:
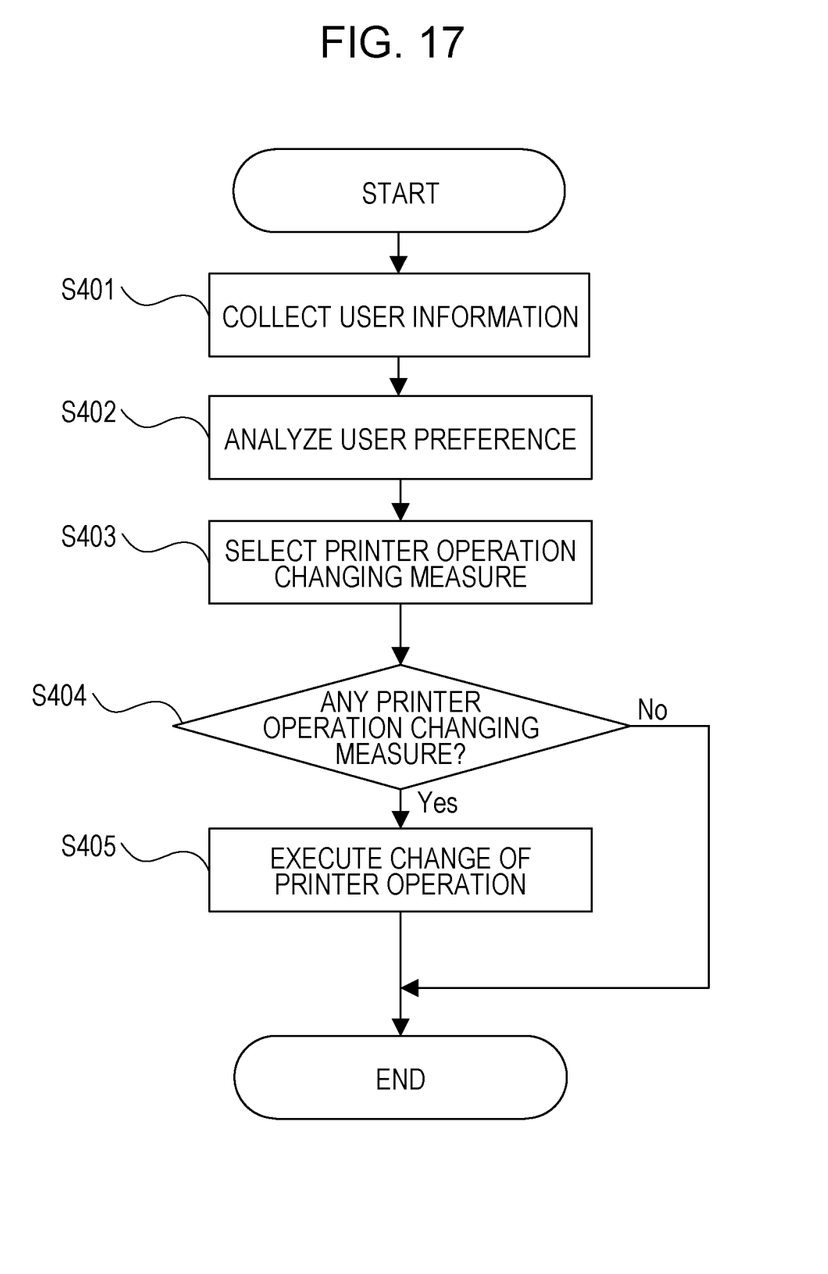
FIG. 17 is a flowchart for determining a printer operation changing measure according to Embodiment 2.

FIG. 17 is a flowchart for determining a printer operation changing measure according to Embodiment 2. A control based on the flowchart in FIG. 17 is executed by the CPU 207 based on a program stored in the ROM 208, for example.

Because the printer operation changing purpose is determined in the manner as illustrated in FIG. 16, user information is collected by the user information collecting unit 400 regarding items relating to selection of a measure that achieves the changing purpose according to this embodiment (S401). Then, furthermore, user preferences are analyzed by the user preference analyzing unit 401 (S402). The printer operation changing unit 500 selects a specific measure on Table 5 based on the user preference analysis result (S403). If there is no selectable measure based on user preferences (if there is no measure with which the printer operation history and the user preferences are compatible), the printer operation changing unit 500 does not select any measure and goes to the next step. The printer operation changing unit 500 determines whether at least one specific measure has been selected that achieves the changing purpose (S404). If so, the printer operation is changed to implement the measure (S405).

According to this embodiment, it is determined from FIG. 15 described above that the intensity of preference for productivity is low. As a specific method for calculating a low intensity of preference, the one adopted in Embodiment 1 may be applied in which an item most different from 6.3 that is an average value of all intensities of preferences is selected. In this case, the intensity of the productivity preference is different from the average by −3.3 at a maximum, which can therefore be selected as the lowest intensity of preference. Then, for the curl reduction purpose, Measure 1 or Measure 4 can be selected which does not contribute to productivity. On the other hand, because the intensity of preference for energy saving is high, it may be determined that Measure 1 is not to be selected because there is a possibility that user satisfaction is lowered.

Therefore, Measure 4 may be selected as a specific printer operation changing measure for the purpose of curl reduction. Based on this result, a printer operation change can be executed. As illustrated in FIG. 13, in a case where it is known that the target user prints a higher number of sheets particularly at 14:00 and 15:00, it is possible that Measure 4 is applied during the time zone.

According to Embodiment 2, as described above, a printer operation changing purpose is first extracted from a printer operation history analysis result, and a specific measure for changing the printer operation can be determined based on a user preference analysis result. As a result, the operation to be performed by the printer 203 can be optimized.

Having described that, according to Embodiments 1 and 2, a laser beam printer is applied as an example, the image forming apparatus applying the present disclosure is not limited thereto but may be any printer or copier based on other printing systems, such as an ink-jet printer.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2018-049981 filed Mar. 16, 2018, which is hereby incorporated by reference herein in its entirety.

What is claimed is:

1. An image forming apparatus comprising:
   an image forming unit configured to form an image on a recording material;
   one or more processors; and
   memory storing instructions that, when executed by the one or more processors, cause the image forming apparatus to perform operations including:
   collecting first information regarding the image forming apparatus,
   collecting second information regarding a user using the image forming apparatus,
   analyzing an operation history of the image forming apparatus based on information regarding the image forming apparatus;
   analyzing a preferred method of use of the image forming apparatus that is preferred by the user based on information regarding the user using the image forming apparatus;
   analyzing a plurality of changeable image forming conditions; and
   changing to an image forming condition that satisfies the preferred method of use of the image forming apparatus from among the plurality of changeable image forming conditions based on the operation history of the image forming apparatus and the preferred method of use of the image forming apparatus.

2. The image forming apparatus according to claim 1, wherein, in a case where there is a selected measure, executing the instructions further causes the image forming apparatus to perform operations including:
   extracting a changing purpose for the image forming operation corresponding with the user preferences,
   wherein the changed image forming condition satisfies the changing purpose.

3. The image forming apparatus according to claim 1, wherein, in a case where there is a selected measure, executing the instructions further causes the image forming apparatus to perform operations including:
   extracting a changing purpose for the image forming operation corresponding with the operation history,
   wherein the changed image forming condition satisfies the changing purpose.

4. The image forming apparatus according to claim 3, wherein executing the instructions further causes the image forming apparatus to perform operations including collecting, after extracting the changing purpose, only information on items necessary for selecting the at least the one measure.

5. The image forming apparatus according to claim 1, wherein the first information regarding the image forming apparatus includes information regarding a number of recording materials having images formed thereon by the image forming apparatus, an environment having the image forming apparatus, a printing ratio of the recording materials recording materials having images formed thereon, and a type of the recording materials having images formed thereon.

6. The image forming apparatus according to claim 1, wherein, in a case where there are answers input through an external apparatus or an operation display, executing the instructions further causes the image forming apparatus to perform operations including:

displaying questions or a questionnaire to the user on an external apparatus connected to the image forming apparatus or on the operation display provided in the image forming apparatus, and collecting the information regarding the user based on the answers input through the external apparatus or the operation display.

7. A method for an image forming apparatus having an image forming unit configured to form an image on a recording material, the method comprising:

collecting first information regarding the image forming apparatus;

collecting second information regarding a user using the image forming apparatus;

analyzing an operation history of the image forming apparatus based on information regarding the image forming apparatus;

analyzing a preferred method of use of the image forming apparatus that is preferred by the user based on information regarding the user using the image forming apparatus;

analyzing a plurality of changeable image forming conditions; and changing to an image forming condition that satisfies the preferred method of use of the image forming apparatus from among the plurality of changeable image forming conditions based on the operation history of the image forming apparatus and the preferred method of use of the image forming apparatus.

8. A non-transitory computer-readable storage medium storing a program to cause a computer to perform a method for an image forming apparatus having an image forming unit configured to form an image on a recording material, the method comprising:

collecting first information regarding the image forming apparatus;

collecting second information regarding a user using the image forming apparatus;

analyzing an operation history of the image forming apparatus based on information regarding the image forming apparatus;

analyzing a preferred method of use of the image forming apparatus that is preferred by the user based on information regarding the user using the image forming apparatus;

analyzing a plurality of changeable image forming conditions; and changing to an image forming condition that satisfies the preferred method of use of the image forming apparatus from among the plurality of changeable image forming conditions based on the operation history of the image forming apparatus and the preferred method of use of the image forming apparatus.

* * * * *